US006364934B1

United States Patent
Nandu et al.

(12) United States Patent
(10) Patent No.: US 6,364,934 B1
(45) Date of Patent: Apr. 2, 2002

(54) METHOD OF MAKING OCULAR DEVICES

(75) Inventors: Mahendra Nandu; Dharmendra M. Jani, both of Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/628,974

(22) Filed: Jul. 31, 2000

(51) Int. Cl.[7] .............................................. B01D 19/00
(52) U.S. Cl. .................... 95/46; 95/141; 96/6; 96/155; 96/219; 210/188
(58) Field of Search ......................... 95/141, 46, 260; 96/155, 219, 179, 6; 210/188

(56) References Cited

U.S. PATENT DOCUMENTS

| | | | |
|---|---|---|---|
| 3,159,646 A | 12/1964 | Milionis et al. ............. 260/308 |
| 3,220,960 A | 11/1965 | Wichterle et al. ............ 260/2.5 |
| 3,408,429 A | 10/1968 | Wichterle ...................... 264/1 |
| 3,469,369 A | * 9/1969 | Helmke |
| 3,496,254 A | 2/1970 | Wichterle ...................... 264/1 |
| 3,761,272 A | 9/1973 | Mannens et al. ............... 96/84 |
| 3,993,462 A | * 11/1976 | Jones |
| 4,136,250 A | 1/1979 | Mueller et al. ................ 528/29 |
| 4,153,641 A | 5/1979 | Deichert et al. ............ 260/827 |
| 4,304,895 A | 12/1981 | Loshack ....................... 526/313 |
| 4,528,311 A | 7/1985 | Beard et al. .................... 524/91 |
| 4,555,732 A | 11/1985 | Tuhro .......................... 358/213 |
| 4,716,234 A | 12/1987 | Dunks et al. ................ 548/259 |
| 4,719,248 A | 1/1988 | Bambury et al. ............ 523/108 |
| 4,758,654 A | * 7/1988 | Brod et al. |
| 4,997,897 A | 3/1991 | Melpolder ................... 526/284 |
| 5,070,215 A | 12/1991 | Bambury et al. ............ 556/418 |
| 5,260,000 A | 11/1993 | Nandu et al. .................. 264/2.1 |
| 5,271,875 A | 12/1993 | Appleton et al. ............. 264/2.3 |
| 5,321,108 A | 6/1994 | Kunzler et al. .............. 526/242 |
| 5,332,423 A | * 7/1994 | Gisko et al. |
| 5,358,995 A | 10/1994 | Lai et al. ..................... 524/547 |
| 5,374,062 A | 12/1994 | Kochevar .................... 273/169 |
| 5,387,662 A | 2/1995 | Kunzler et al. ............. 526/245 |
| 5,420,324 A | 5/1995 | Lai et al. ..................... 556/419 |
| 5,435,943 A | 7/1995 | Adams et al. ................ 264/1.1 |
| 5,451,651 A | 9/1995 | Lai ............................. 526/302 |
| 5,496,871 A | 3/1996 | Lai et al. ..................... 523/107 |
| 5,509,954 A | * 4/1996 | Derian et al. |
| 5,539,016 A | 7/1996 | Kunzler et al. ............. 523/107 |

(List continued on next page.)

FOREIGN PATENT DOCUMENTS

| | | | | |
|---|---|---|---|---|
| EP | 0 017 512 A | 4/1980 | ......... C08F/226/06 |
| WO | WO 86/01219 | 3/1986 | ........... C08L/83/00 |

OTHER PUBLICATIONS

Patent Abstracts of Japan vol. 013, vol. 013, No .504 (C–653), Nov. 13, 1989 & JP 01 201306 A (Show A Denko KK), Aug. 14, 1989 abstract & Database WPI/Derwent Online! Derwent; AN1989–275119, abstract.

Patent Abstracts of Japan vol. 013, No. 504 (C–653), Nov. 13, 1989 & JP 01 201316A (Show A Denko KK), Aug. 14, 1989 abstract & Database WPI/Derwent Online! Derwent; AN1989–275126, abstract.

Patent Abstracts of Japan vol. 006, No. 098 (C–106), Jun. 8, 1982 & JP 57 028117 (Seiko Epson Corp), Feb. 15, 1982 & Database WPI/Derwent Online! Derwent; AN1982–23185, abstract.

*Primary Examiner*—Duane S. Smith
(74) *Attorney, Agent, or Firm*—Robert B. Furr, Jr.; Denis A. Polyn

(57) ABSTRACT

A method of decreasing the amount of cosmetic defects in contact lenses made from hydrophilic and hydrophobic monomers. By filtering the monomer mixture with a filter, the hydrophilic and hydrophobic components are finely dispersed throughout the mixture. Dissolved gases contained within the mixture are also finely dispersed. Contact lenses produced from this method have improved optical quality.

35 Claims, 2 Drawing Sheets

U.S. PATENT DOCUMENTS

| | | | |
|---|---|---|---|
| 5,584,416 A | * 12/1996 | Florian | |
| 5,591,252 A | * 1/1997 | Haeuser | |
| 5,594,085 A | 1/1997 | Lai | 526/302 |
| 5,610,252 A | 3/1997 | Bambury et al. | 526/279 |
| 5,639,908 A | 6/1997 | Lai | 560/158 |
| 5,648,515 A | 7/1997 | Lai | 560/115 |
| 5,656,208 A | 8/1997 | Martin et al. | 264/1.1 |
| 5,688,910 A | * 11/1997 | Wang | |
| 5,710,302 A | 1/1998 | Kunzler et al. | 556/434 |
| 5,714,557 A | 2/1998 | Kunzler et al. | 526/279 |
| 5,753,150 A | 5/1998 | Martin et al. | 264/2.5 |
| 5,789,464 A | 8/1998 | Muller | 523/108 |
| 5,804,107 A | 9/1998 | Martin et al. | 264/1.36 |
| 5,814,134 A | 9/1998 | Edwards et al. | 96/6 |
| 5,855,825 A | 1/1999 | Ito et al. | 264/2.6 |
| 5,860,737 A | * 1/1999 | Hauser | |
| 5,922,249 A | * 7/1999 | Ajello et al. | |

* cited by examiner

METHOD OF MAKING OCULAR DEVICES

BACKGROUND OF THE INVENTION

The present invention generally relates to an improved method of making biomedical ocular devices from a monomer mixture containing hydrophilic and hydrophobic components. By filtering the monomer mixture, the hydrophilic and hydrophobic components are finely dispersed within the mixture. Additionally, the presence of microbubbles is decreased. This method is useful in preparing contact lenses, intraocular lenses and ocular devices such as corneal rings, for example.

Biomedical ocular devices are made from a variety of materials. In general, there are three classes of materials which are used to prepare contact lenses, intraocular lenses, or ocular devices: hydrogels, non-hydrophilic soft materials, and rigid gas permeable materials.

A common type of material for use as a soft contact lens is a hydrogel (see for example, U.S. Pat. No. 3,220,960 to Drahoslav and Wichterle). Hydrogels constitute crosslinked polymeric systems that can absorb and retain water in an equilibrium state. Hydrogels generally have a water content greater than about 5 weight percent and more commonly between about 10 to about 80 weight percent.

A particular group of hydrogel materials include those containing silicone monomers. Polymeric silicone materials are generally hydrophobic and have been used in a variety of biomedical applications, including contact lenses and intraocular lenses. Silicone-containing monomers in contact lenses are desired to increase the oxygen permeability or DK value. Such materials are usually prepared by polymerizing a mixture containing at least one silicone-containing monomer and at least one hydrophilic monomer.

Hydrophobic materials, including silicone-containing monomers, have poor compatibility with hydrophilic monomers. Poor compatibility may result in phase separation where the components of the mixture may actually separate out upon standing or not be uniformly dispersed throughout the solution. In extreme cases, aggregation of the components may result in separate layers. Poor compatibility of the components may result in opaque materials upon curing. This can be particularly problematic when preparing monomer mixtures to be used to make contact lenses since it is necessary that the contact lens be optically clear.

Diluents have typically been used to overcome this incompatibility. A diluent is defined as a substance which is substantially nonreactive with the components in the monomer mixture. Diluents may be aqueous or organic in nature.

In addition to a uniformly dispersed mixture, the monomer mixture must be free of contaminants and microbubbles to ensure the formation of a transparent lens upon curing. The monomer mixture may need to be filtered to remove any contaminants from the initial monomers. The presence of contaminants will affect the transparency of the cured lens, resulting in poor optical quality for the wearer. U.S. Pat. No. 5,789,464 to Muller discloses purifying prepolymers by precipitation with acetone, dialysis or ultrafiltration, with ultrafiltration being especially preferred. Continuously purifying the solution by ultrafiltration results in a selected degree of purity, which can be as high as desired. Pure prepolymers or comonomers result in monomer mixtures free of contaminants resulting in good quality of optical lenses.

Dissolved gases may cause microbubbles in the resultant cured product which may also affect the optical quality and transparency of the cured lens. The dissolved gases are oxygen and nitrogen from the air and may interfere with polymerization. Microbubbles may form in the monomer liquid upon standing or as the monomer mixture progresses through a manufacturing line toward a casting machine.

The monomer mixture may be subjected to a vacuum to remove any dissolved gases in the monomer mixture. Unfortunately, vacuum may also evaporate volatile components from the monomer mixture. U.S. Pats. No. 5,435,943 (Adams et al); U.S. Pat. No. 5,656,208 (Martin et al); U.S. Pat. No. 5,753,150 (Martin et al) and U.S. Pat. No. 5,804,107 (Martin et al) disclose filtering and degassing the monomer mixture. In these patents, the monomer mixture is placed in a drum and drawn by the action of a pump. The monomer passes through a filter in order to remove extraneous particulate contaminates that may be present in the monomer. The monomer then proceeds through a separate degassing unit. The degassing unit consists of a monomer in a gas permeable line, which is surrounded by a chamber. Contained within the gas permeable line is a static flow mixer which causes a turbulent flow and the boundary layer to be broken up. The chamber is maintained at a subatmospheric pressure. Under such conditions, the gases within the monomer mixture are removed. The process of first filtering the monomer mixture and then degassing involves multiple stages.

Non-homogeneous dispersement of monomer components and dissolved gases result in poor optical quality of cured contact lenses, intraocular devices, and ocular devices including corneal rings. The present invention provides for a simple method which improves the optical quality of such lenses and devices.

SUMMARY OF THE INVENTION

The present invention is an improved method for producing biomedical ocular devices including contact lenses, intraocular lenses and devices such as corneal rings. The biomedical ocular devices are made from a monomer mixture comprised of a hydrophilic monomer and a hydrophobic monomer. By filtering the monomer mixture through an in-line filter prior to casting, the hydrophilic and hydrophobic monomers are finely dispersed. Additionally, the dissolved gases are broken down, thereby reducing the formation of undesirably large bubbles in the finished biomedical ocular device. The filtration leads to a more homogeneous mixture thereby improving the optical clarity of the finished biomedical ocular device.

DETAILED DESCRIPTION OF PREFERRED EMBODIMENTS

Figure 1:
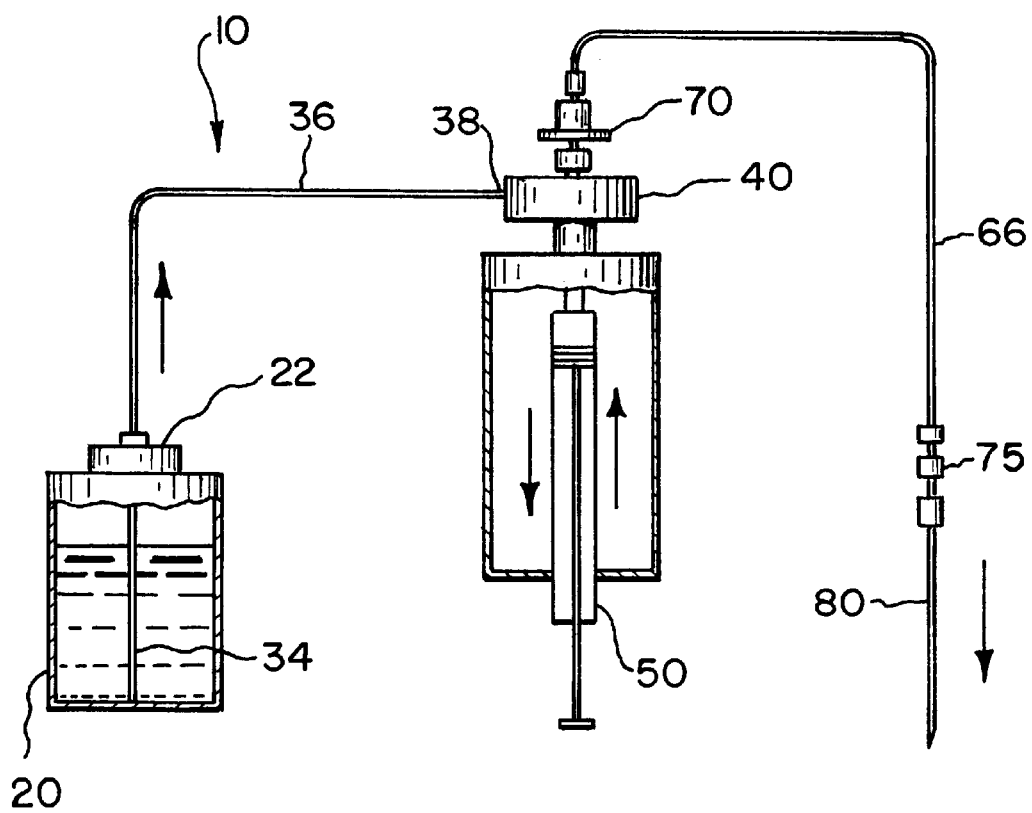
FIG. 1 is a simplified flow chart showing the various components of an apparatus to filter monomer mixture used in molding contact lenses.

The present invention is an improved method for producing biomedical ocular devices, in particular contact lenses, intraocular lenses and devices such as corneal rings. The biomedical ocular device is made from a monomer mixture comprising a hydrophilic monomer and a hydrophobic monomer, wherein the improvement comprises filtering the monomer mixture with an in-line filter. Filtering the monomer mixture prior to casting the lens leads to a fine dispersion or distribution of the components. The biomedical ocular devices produced by this method have improved cosmetic yield and optical clarity.

Any known biomedical ocular device composition containing dissimilar materials may be used with this invention. Preferred compositions have both hydrophilic and hydrophobic monomers. Especially preferred are silicone hydrogels.

Silicone hydrogels are prepared by polymerizing a mixture containing at least one silicone-containing monomer and at least one hydrophilic monomer. The silicone-containing monomer may function as a crosslinking agent (a crosslinker being defined as a monomer having multiple polymerizable functionalities) or a separate crosslinker may be employed.

An early example of a silicone-containing contact lens material is disclosed in U.S. Pat. No. 4,153,641 (Deichert et al assigned to Bausch & Lomb Incorporated). Lenses are made from poly(organosiloxane) monomers which are α, ω terminally bonded through a divalent hydrocarbon group to a polymerized activated unsaturated group. Various hydrophobic silicone-containing prepolymers such as 1,3-bis (methacryloxyalkyl)-polysiloxanes were copolymerized with known hydrophilic monomers such as 2-hydroxyethyl methacrylate (HEMA).

U.S. Pat. No. 5,358,995 (Lai et al) describes a silicone hydrogel which is comprised of an acrylic ester-capped polysiloxane prepolymer, polymerized with a bulky polysiloxanylalkyl (meth)acrylate monomer, and at least one hydrophilic monomer. Lai et al is assigned to Bausch & Lomb Incorporated and the entire disclosure is incorporated herein by reference. The acrylic ester-capped polysiloxane prepolymer, commonly known as $M_2D_x$ consists of two acrylic ester end groups and "x" number of repeating dimethylsiloxane units. The preferred bulky polysiloxanylalkyl (meth)acrylate monomers are TRIS-type (methacryloxypropyl tris(trimethylsiloxy)silane) with the hydrophilic monomers being either acrylic- or vinyl-containing.

The silicone-containing monomers may be copolymerized with a wide variety of hydrophilic monomers to produce silicone hydrogel lenses. Preferred hydrophilic monomers may be either acrylic- or vinyl-containing. The term "vinyl-type or "vinyl-containing" monomers refers to monomers containing the vinyl grouping ($CH_2=CHR$) and are generally reactive. Such hydrophilic vinyl-containing monomers are known to polymerize easily. Acrylic-containing monomers are those monomers containing the acrylic group ($CH_2=CRCOX$) wherein R=H or $CH_3$ and X=O or NH, which are known to polymerize readily.

Suitable hydrophilic monomers include: unsaturated carboxylic acids, such as methacrylic and acrylic acids; acrylic substituted alcohols, such as 2-hydroxyethylmethacrylate and 2-hydroxethylacrylate; vinyl lactams, such as N-vinyl pyrrolidone; and acrylamides, such as methacrylamide and N,N-dimethylacrylamide. A further example is the hydrophilic oxazolone monomers disclosed in U.S. Pat. No. 4,910,277 (Bambury et al). Other suitable hydrophilic monomers will be apparent to one skilled in the art.

Other examples of silicone-containing monomer mixtures which may be used with this invention include the following: vinyl carbonate and vinyl carbamate monomer mixtures as disclosed in U.S. Pat. Nos. 5,070,215 and 5,610,252 (Bambury et al); fluorosilicone monomer mixtures as disclosed in U.S. Pat. Nos. 5,321,108; 5,387,662 and 5,539,016 (Kunzler et al); fumarate monomer mixtures as disclosed in U.S. Pat. Nos. 5,374,662; 5,420,324 and 5,496,871 (Lai et al) and urethane monomer mixtures as disclosed in U.S. Pat. Nos. 5,451,651; 5,648,515; 5,639,908 and 5,594,085(Lai et al), all of which are commonly assigned to assignee herein Bausch & Lomb Incorporated, and the entire disclosures of which are incorporated herein by reference.

Examples of non-silicone hydrophobic materials include alkyl acrylates and methacrylates.

The reaction mixture may additionally comprise a diluent. As previously stated, diluents are substantially nonreactive with the monomers in the monomeric mixture. The diluent is generally removed after polymerization.

Water may be used as a diluent, or alternately, an organic diluent may be employed, including: monohydric alcohols, with $C_6$–$C_{10}$ straight-chained aliphatic monohydric alcohols, such as n-hexanol and n-nonanol, being especially preferred; diols, such as ethylene glycol; polyols, such as glycerin; ethers, such as dipropylene glycol and diethylene glycol monobutyl ether; ketone, such as methyl ethyl ketone; esters, such as methyl enanthate, ethylene carbonate and glyceryl triacetate; and hydrocarbons. Other suitable diluents will be apparent to a person of ordinary skill in the art. Preferred diluents include 3,7-dimethyl-3-octanol, methyl enanthate, hexanol and nonanol.

The monomer mix of the present invention may include additional constituents such as UV-absorbing agents, initiators, crosslinking agents, internal wetting agents, hydrophilic monomeric units, toughening agents, or colorants such as those known in the contact lens art.

Conventional curing methods such as UV polymerization, thermal polymerization, or combinations thereof, can be used to cast these ethylenically unsaturated compounds. Representative free radical thermal polymerization initiators can be organic peroxides and are usually present in the concentration of about 0.01 to 1 percent by weight of the total monomer mixture. Representative UV initiators are known in the field such as, benzoin methyl ether, benzoin ethyl ether, 1164, 2273, 1116, 2959, 3331 (EM Industries) and Irgacure 651 and 184 (Ciba-Geigy). In the preferred embodiment, Darocur 1173 is the UV initiator.

The monomer mixture may include a tinting agent, defined as an agent that, when incorporated in the final lens, imparts some degree of color to the lens. Conventional tinting agents are known in the art, including non-polymerizable agents, or polymerizable agents that include an activated unsaturated group that is reactive with the lens-forming monomers. One preferred example of this latter class is the compound 1,4-bis(4-(2-methacryloxyethyl)phenylamino)anthraquinone, a blue visibility-tinting agent disclosed in U.S. Pat. No. 4,997,897 (Melpolder).

The monomer mixture may also include a UV-absorbing agent, defined as an agent that reduces light in the general region of 200 to 400 nm. Representative polymerizable UV absorbing materials for contact lens applications are described in U.S. Pat. No. 4,304,895 (Loshaek), U.S. Pat. No. 4,528,311 (Beard et al), U.S. Pat. No. 4,716,234 (Dunks et al), U.S. Pat. No. 4,719,248 (Bambury et al), U.S. Pat. No. 3,159,646 (Milionis et al) and U.S. Pat. No. 3,761,272 (Manneus et al). Examples of UV-absorbing compounds include the benzotriazoles and benzophenones.

Silicone hydrogels of this invention are typically formed by polymerizing a monomer mixture comprising: about 10 to about 90 weight percent of a silicone-containing monomer, preferably 20 to 70 weight percent of a silicone-containing monomer, more preferably 40 to 70 weight percent; about 5 to about 70 weight percent of a hydrophilic monomer, preferably 10 to 50 weight percent of a hydrophilic monomer, more preferably 20 to 40 weight percent of a hydrophilic monomer; and about 5 to about 50 weight percent of a diluent, preferably 5 to 40 weight percent of a diluent, more preferably 5 to 30 weight percent of a diluent.

Various techniques for molding hydrogel polymer mixtures into contact lenses are known in the art, including spin casting and cast molding. Spin casting processes are disclosed in U.S. Pat. Nos. 3,408,429 and 3,496,254. U.S Pat. No. 4,555,732 discloses a process in which the lens is initially cured by spincasting. The lens is subsequently lathe cut to provide a contact lens having the desired thickness and lens surface.

Another method of forming and curing a lens is cast molding. Cast molding involves charging a quantity of polymerizable monomeric mixture to a mold assembly, and curing the monomeric mixture while retained in the mold assembly to form a lens, for example, by free radical polymerization of the monomeric mixture. The mold assembly defines a mold cavity for casting the lens, including an anterior mold for defining the anterior lens surface and a posterior mold for defining the posterior lens surface. U.S. Pat. No. 5,271,875 describes a static cast molding method that permits molding of a finished lens in a mold cavity defined by a posterior mold and an anterior mold.

Examples of techniques to cure the lens material include heat, microwave radiation, infrared radiation, electron beam radiation, gamma radiation, ultraviolet (UV) radiation, and the like; combinations of such techniques may be used.

Regardless of which method is used to cast the lens, it is important that casting conditions be maintained as to minimize any adverse affects on the monomer mixture.

Besides contact lenses and intraocular lenses, another application for this invention is the manufacture of ocular devices such as intrastromal corneal rings. These devices are flexible rings which are inserted beneath the surface of the cornea to elevate the edge of the cornea. This results in the front of the eye being flattened, decreasing nearsightedness.

Additionally, another application may include the manufacture of an ocular device which may be used as an ophthalmic drug delivery vehicle. This may be in the form similar to that of a shield worn on the eye or an insert placed in the ocular region. Inserts can also be used to deliver lubricants and other medicaments to the ocular area.

A simplified flow chart for processing a monomer mixture is shown in FIG. 1. In particular, FIG. 1 shows the various components of an apparatus used to finely disperse the monomer mixture components used in molding contact lenses.

As illustrated in FIG. 1, apparatus 10 contains container 20, line 36, switching valve 40, pump 50, line 66, filter 70 and injection needle 80.

Typically, monomer mixture is provided in container 20 having cap 22. Line 36 includes end 34 which extends to the bottom of container 20. Opposite end 38 of line 36 extends into a side of switching valve 40.

Pump 50 is connected to switching valve 40. Pump 50 may be a syringe or any other mechanism such that pump 50 is able to create a vacuum and pull liquid from container 20 into line 36 and thereby into switching valve 40. Switching valve 40 is open to line 36 when pump 50 draws liquid from container 20 but is closed to injection line 66. Pump 50 is preferably a small volume syringe (i.e., 250 μL) and able to accurately dispense microliter aliquots of liquid. Once pump 50 has finished the drawing of liquid from container 20, switching valve 40 will close so that pump 50 can push the liquid into filter 70.

Filter 70 is a filter having a small pore size, preferably 0.22 μm pore size. The diameter and filter membrane area may be any appropriate size. Preferred is a replaceable or disposable filter membrane that is 13 mm in diameter and has a 0.8 cm$^2$ filter area. The filter membrane may be any inert material commonly used to filter organic solvents. A preferred filter membrane material is polytetrafluoroethylene (PTFE), which is a stable polymer inert to most chemicals. Filter 70 is connected to line 66. Connector 75 joins line 66 to injection needle 80. Injection needle 80 leads to a lens casting machine (not shown) where the filtered monomer mixture will be placed into a contact lens mold and cured to form a contact lens. The amount of monomer mixture used to make a contact lens is small, approximately 40 μL per lens. Due to the small amount of liquid dispensed, the pressure of the overall system is low. The pressure exerted through the injection line by the syringe pump is dissipated when the monomer is dispensed.

Figure 2:
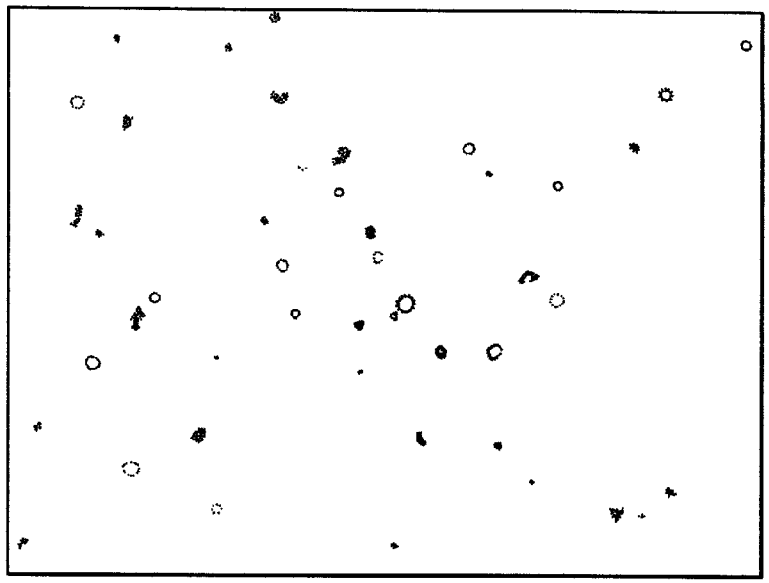
FIG. 2 is a light microscopic photograph taken under 10×-magnification showing a contact lens cast without dispersion of the monomer mixture.

FIG. 2 depicts a 10×magnification of cured contact lens examined under a light microscope. The monomer mixture used to cast this lens was prepared without dispersion of the monomer mixture. There appear numerous "spots", some of which are dark and some which are light circles ringed in dark perimeters. These spots represent microbubbles trapped within the dimensions of the lens matrix.

Figure 3:
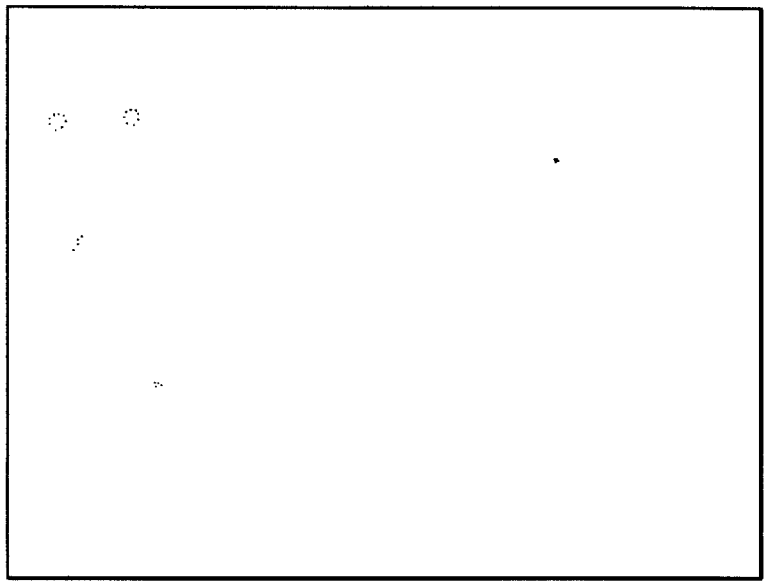
FIG. 3 is a light microscopic photograph taken under 10×-magnification showing a contact lens cast with dispersion of the monomer mixture.

FIG. 3 depicts a 10×magnification of cured contact lens. The monomer mixture prior to curing has been filtered through a 0.22 μm filter in accordance with the present invention. There are fewer "spots" in this figure than in FIG. 2. This indicates that the monomer mixture has been dispersed, i.e., the presence of microbubbles has been decreased and are not visible under this magnification. FIG. 3 shows a lens which has better optical clarity than the lens in FIG. 2.

As stated previously, by filtering the monomer mixture through a filter just prior to casting, the hydrophilic and hydrophobic components are finely dispersed. Any dissolved gases contained within the monomer mixture are broken up and finely dispersed throughout the mixture. Cured contact lenses thus produced have few instances of cosmetic defects. Intraocular lenses and ocular devices such as corneal rings would also have improved optical clarity and few instances of cosmetic defects.

COMPARATIVE EXAMPLE 1

Monomer mixture was prepared by combining 55 parts by weight TRIS-VC (tris(trimethylsiloxy)silylpropyl methacrylate), 30 parts by weight NVP (N-vinyl pyrrolidone), 15 parts by weight $V_2D_{25}$ (a silicone-containing vinyl carbonate), 15 parts by weight 1-nonanol, 1 parts by weight Vinal Acid (N-vinyloxycarbonyl alanine), 0.5 parts by weight Darocur 1173 and 150 ppm by weight tint. Each component was individually weighed and added sequentially to a glass container. The solution was mixed for at least 1–2 hours and filtered through a 5 μm PTFE filter. The resulting solution was visually transparent. Lenses were cast and cured under the presence of UV light. Lenses were released from the molds, hydrated and examined for particle defects.

TABLE 1

| EXAMPLE | Cosmetic Yield % |
|---------|------------------|
| 1       | 70.0             |

EXAMPLES 2–7

Monomer mixture was prepared as in Example 1. Prior to casting, the mixture was passed through a 0.22 μm PTFE in-line filter and immediately cast.

TABLE 2

| EXAMPLE | Cosmetic Yield % |
|---------|------------------|
| 2       | 98.0             |
| 3       | 98.0             |
| 4       | 97.6             |
| 5       | 98.2             |
| 6       | 97.7             |
| 7       | 98.3             |

By using a 0.22 μm in-line filter, the cosmetic yield (particle defects) increased significantly as compared to Example 1, thus also significantly reducing the number of defective lenses which would otherwise be discarded.

While the above serves to illustrate preferred embodiments, it is understood that the invention is not limited thereto, and modifications and variations would be evident to a person of ordinary skill in the art.

We claim:

1. A method of producing an ocular device made from a monomer mixture, said method comprising filtering said monomer mixture to sufficiently to disperse the monomer components and thereby minimizing the presence of microbubbles and aggregates in said mixture, thus improving optical clarity in said ocular device.

2. The method of claim 1, wherein said monomer mixture comprises a hydrophilic monomer and a hydrophobic monomer.

3. The method of claim 1, wherein said filtering utilizes a replaceable polytetrafluoroethylene membrane filter.

4. The method of claim 3, wherein said filter has a submicron porosity.

5. The method of claim 4, wherein said filter is a 0.22 μm filter.

6. The method of claim 2, wherein said hydrophobic monomer is a silicone-containing monomer.

7. The method of claim 6, wherein said silicone-containing monomer is an acrylic ester-capped polysiloxane.

8. The method of claim 7, wherein said acrylic ester-capped polysiloxane has 15 to 200 repeating dimethylsiloxane units.

9. The method of claim 8, wherein said acrylic ester-capped polysiloxane has 25 to 100 repeating dimethylsiloxane units.

10. The method of claim 9, wherein said acrylic ester-capped polysiloxane has 25 repeating dimethylsiloxane units.

11. The method of claim 2, wherein said hydrophilic monomer is N-vinyl pyrrolidone.

12. The method of claim 2, wherein said hydrophilic monomer is N,N-dimethylacrylamide.

13. The method of claim 2, wherein said hydrophilic monomer is 2-hydroxyethylmethacrylate.

14. The method of claim 2, wherein said monomer mixture further comprises an organic diluent.

15. The method of claim 14, wherein said diluent is an alcohol.

16. The method of claim 15, wherein said organic diluent is selected from the group consisting of n-hexanol and n-nonanol.

17. The method of claim 2, wherein said monomer mixture further comprises a bulky polysiloxanylalkyl (meth) acrylate monomer.

18. The method of claim 17, wherein said bulky polysiloxanylalkyl (meth)acrylate monomer is methacryloxypropyl tris(trimethylsiloxy)silane.

19. The method of claim 2, wherein said monomer mixture further comprises a vinyl carbonate monomer.

20. The method of claim 2, wherein said hydrophobic monomer comprises a silicone-containing vinyl carbonate monomer.

21. The method of claim 2, wherein said monomer mixture further comprises a vinyl carbamate monomer.

22. The method of claim 2, wherein said hydrophobic monomer comprises a silicone-containing vinyl carbamate monomer.

23. The method of claim 2, wherein said monomer mixture further comprises a fluorinated silicone-containing monomer.

24. The method of claim 2, wherein said monomer mixture further comprises a fumarate-containing monomer.

25. The method of claim 2, wherein said hydrophobic monomer comprises a silicone-containing fumarate monomer.

26. The method of claim 2, wherein said monomer mixture further comprises a urethane-containing monomer.

27. The method of claim 1, wherein said device is a hydrogel.

28. The method of claim 27, wherein said hydrogel is a contact lens.

29. The method of claim 1, wherein said device is an intraocular lens.

30. The method of claim 1, wherein said device is a corneal ring.

31. An apparatus for producing an ocular device comprising:

a) a container for supplying a monomer mixture, said monomer mixture comprised of a hydrophilic monomer and a hydrophobic monomer;

b) means for filtering said monomer mixture contained in said container; and c) means for pumping said monomer mixture from said container, said pumping means connected to said filtering means, whereby said filtering means is operable to finely disperse said monomer mixture components and minimize bubble formation within said monomer mixture.

32. The apparatus of claim 31, wherein said filter is a replaceable polytetrafluoroethylene membrane filter.

33. The apparatus of claim 32, wherein said filter has a submicron porosity.

34. The apparatus of claim 33, wherein said filter is a 0.22 μm filter.

35. The apparatus of claim 34, wherein said means for pumping said monomer mixture comprises a syringe.

* * * * *